(12) United States Patent
Albers et al.

(10) Patent No.: US 7,269,955 B2
(45) Date of Patent: Sep. 18, 2007

(54) METHODS AND APPARATUS FOR MAINTAINING ROTOR ASSEMBLY TIP CLEARANCES

(75) Inventors: Robert Joseph Albers, Park Hills, KY (US); Rafael Ruiz, Mason, OH (US); Marcia Boyle, Lebanon, OH (US); Christopher Charles Glynn, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 10/925,465

(22) Filed: Aug. 25, 2004

(65) Prior Publication Data
US 2006/0042266 A1 Mar. 2, 2006

(51) Int. Cl.
*F02C 6/08* (2006.01)
(52) U.S. Cl. .......................... 60/782; 60/728
(58) Field of Classification Search .................. 60/782, 60/262, 226.1, 728; 415/173.2, 173.6, 173.1
See application file for complete search history.

(56) References Cited

U.S. PATENT DOCUMENTS

| | | | |
|---|---|---|---|
| 4,363,599 A | 12/1982 | Cline et al. | |
| 4,773,212 A * | 9/1988 | Griffin et al. | 60/772 |
| 4,893,983 A | 1/1990 | McGreehan | |
| 4,893,984 A | 1/1990 | Davison et al. | |
| 4,928,240 A | 5/1990 | Davison et al. | |
| 5,018,942 A | 5/1991 | Ciokajlo et al. | |
| 5,123,242 A * | 6/1992 | Miller | 60/226.1 |
| 5,127,793 A | 7/1992 | Walker et al. | |
| 5,163,285 A * | 11/1992 | Mazeaud et al. | 60/806 |
| 5,205,115 A | 4/1993 | Plemmons et al. | |
| 5,212,940 A | 5/1993 | Glover | |
| 5,228,828 A | 7/1993 | Damlis et al. | |
| 5,273,396 A | 12/1993 | Albrecht et al. | |
| 5,281,085 A | 1/1994 | Lenahan et al. | |
| 5,317,877 A * | 6/1994 | Stuart | 60/736 |
| 5,392,614 A * | 2/1995 | Coffinberry | 62/402 |
| 5,581,996 A * | 12/1996 | Koch et al. | 607/782 |
| 5,641,267 A | 6/1997 | Proctor et al. | |
| 5,678,408 A * | 10/1997 | Janes | 60/728 |
| 5,685,693 A | 11/1997 | Sexton et al. | |
| 5,779,442 A | 7/1998 | Sexton et al. | |
| 5,782,077 A * | 7/1998 | Porte | 60/782 |
| 5,906,473 A | 5/1999 | Sexton et al. | |
| 5,913,658 A | 6/1999 | Sexton et al. | |
| 5,918,458 A * | 7/1999 | Coffinberry et al. | 60/785 |
| 6,065,282 A * | 5/2000 | Fukue et al. | 60/39.182 |
| 6,079,943 A | 6/2000 | Sexton et al. | |
| 6,082,963 A | 7/2000 | Sexton et al. | |
| 6,250,061 B1 * | 6/2001 | Orlando | 60/772 |
| 6,361,277 B1 | 3/2002 | Bulman et al. | |
| 6,454,529 B1 | 9/2002 | Zearbaugh et al. | |
| 6,471,474 B1 | 10/2002 | Mielke et al. | |
| 6,511,294 B1 | 1/2003 | Mielke et al. | |

(Continued)

*Primary Examiner*—William H. Rodriguez
(74) *Attorney, Agent, or Firm*—William Scott Andes; Armstrong Teasdale LLP

(57) ABSTRACT

A method of operating a gas turbine engine is provided. The gas turbine engine includes at least one engine casing and at least one rotor assembly. The method includes directing airflow through a supply pipe and into a heat exchanger, lowering the temperature of the airflow in the heat exchanger, and directing the cooled airflow into the engine casing to cool the casing.

16 Claims, 2 Drawing Sheets

U.S. PATENT DOCUMENTS

| | | |
|---|---|---|
| 6,550,254 B2 | 4/2003 | Proctor et al. |
| 6,584,778 B1 * | 7/2003 | Griffiths et al. ............... 60/782 |
| 6,672,072 B1 * | 1/2004 | Giffin, III ................... 60/782 |
| 6,722,137 B2 | 4/2004 | Proctor et al. |
| 6,968,696 B2 * | 11/2005 | Little ......................... 60/772 |
| 7,000,404 B2 * | 2/2006 | Palmisano et al. ............ 60/782 |

* cited by examiner

METHODS AND APPARATUS FOR MAINTAINING ROTOR ASSEMBLY TIP CLEARANCES

BACKGROUND OF THE INVENTION

This invention relates generally to gas turbine engines, and more particularly, to methods and apparatus to control gas turbine engine rotor assembly tip clearances during transient operation.

Gas turbine engines typically include an engine casing that extends circumferentially around a compressor, and a turbine including a rotor assembly and a stator assembly. The rotor assembly includes at least one row of rotating blades that extend radially outward from a blade root to a blade tip. A radial tip clearance is defined between the rotating blade tips and a shroud attached to the engine casing.

During engine operation, the thermal environment in the engine varies and may cause thermal expansion or contraction of the rotor and stator assemblies. This thermal growth or contraction may or may not occour uniformly in magnitude or rate. As a result, inadvertent rubbing between the rotor blade tips and the engine casing may occur or the radial clearances may be more open than the design intent. Continued rubbing between the rotor blade tips and engine casing may lead to premature failure of the rotor blade or larger clearances at other operating conditions which can result in loss of engine performance.

To facilitate optimizing engine performance and to minimize inadvertent rubbing between the rotor blade tips and the engine casing, at least some known engines include a clearance control system. The clearance control system supplies cooling air to the engine casing to control thermal growth of the engine casing to facilitate minimizing inadvertent blade tip rubbing. The case is heated and cooled by air coming from fan, booster, or compressor compressor bleed sources, which may cause the case to shrink or expand due to changes in temperature.

Some known clearance control systems account for disk elastic deflection and blade thermal growth from idle conditions to aircraft take-off by having a large clearance at idle in order to prevent blade tip rubs later in the engine cycle. These systems require a large change in temperature at steady-state conditions to reduce clearance to a minimum level. Typically, the temperature change of the case that is necessary to reduce the steady-state clearance is beyond the capability of these systems.

BRIEF DESCRIPTION OF THE INVENTION

In one aspect, a method of operating a gas turbine engine is provided. The gas turbine engine includes an engine casing and at least one rotor assembly. The method includes directing airflow through a supply pipe and into a heat exchanger, lowering the temperature of the airflow in the heat exchanger, and directing the cooled airflow into the engine casing to cool the casing.

In another aspect, a clearance control system for a gas turbine engine is provided. The gas turbine engine includes a compressor having at least one stage and a discharge, a high pressure turbine having at least one disk, and at least one engine casing extending circumferentially around the compressor and high pressure turbine. The clearance control system includes an air supply pipe configured to direct air from at least one of the fan booster and compressor to the high pressure turbine, and a heat exchanger in flow communication with the air supply pipe to cool an airflow passing through the air supply line.

In another aspect, a gas turbine engine is provided that includes a compressor, a high pressure turbine, at least one engine casing, including a cooling air inlet, extending circumferentially around the compressor and high pressure turbine, and a clearance control system. The clearance control system includes an air supply pipe coupled to the casing cooling air inlet, and a heat exchanger coupled to and in flow communication with the air supply pipe to cool an airflow in the air supply pipe.

DETAILED DESCRIPTION OF THE INVENTION

A clearance control system for a gas turbine engine that includes a heat exchanger to lower the temperature of air that is used to cool the turbine casing is described below in detail. The cooling air can come from any source inside the engine, for example, from the middle stages of the compressor, or the compressor discharge. The cooling air that has been cooled in the heat exchanger is used to cool the turbine casing and turbine shrouds. The air can also be directed to the high pressure turbine disk cavity to cool the aft surface of the high pressure turbine disk. Further, to improve efficiency, a portion of the cooling air is redirected to the heat exchanger to be cooled and reused. Using air that has been cooled by the heat exchanger permits the stator to achieve a greater change in temperature for clearance closure, especially during steady state conditions. Also, cooling the high pressure turbine disk reduces disk thermal growth, which typically accounts for the majority of the total closure of blade tip clearances. The clearance control system described in detail below permits tighter build clearances, reduced operational thermal closure of clearances, and minimizes blade tip rubs.

Figure 1:
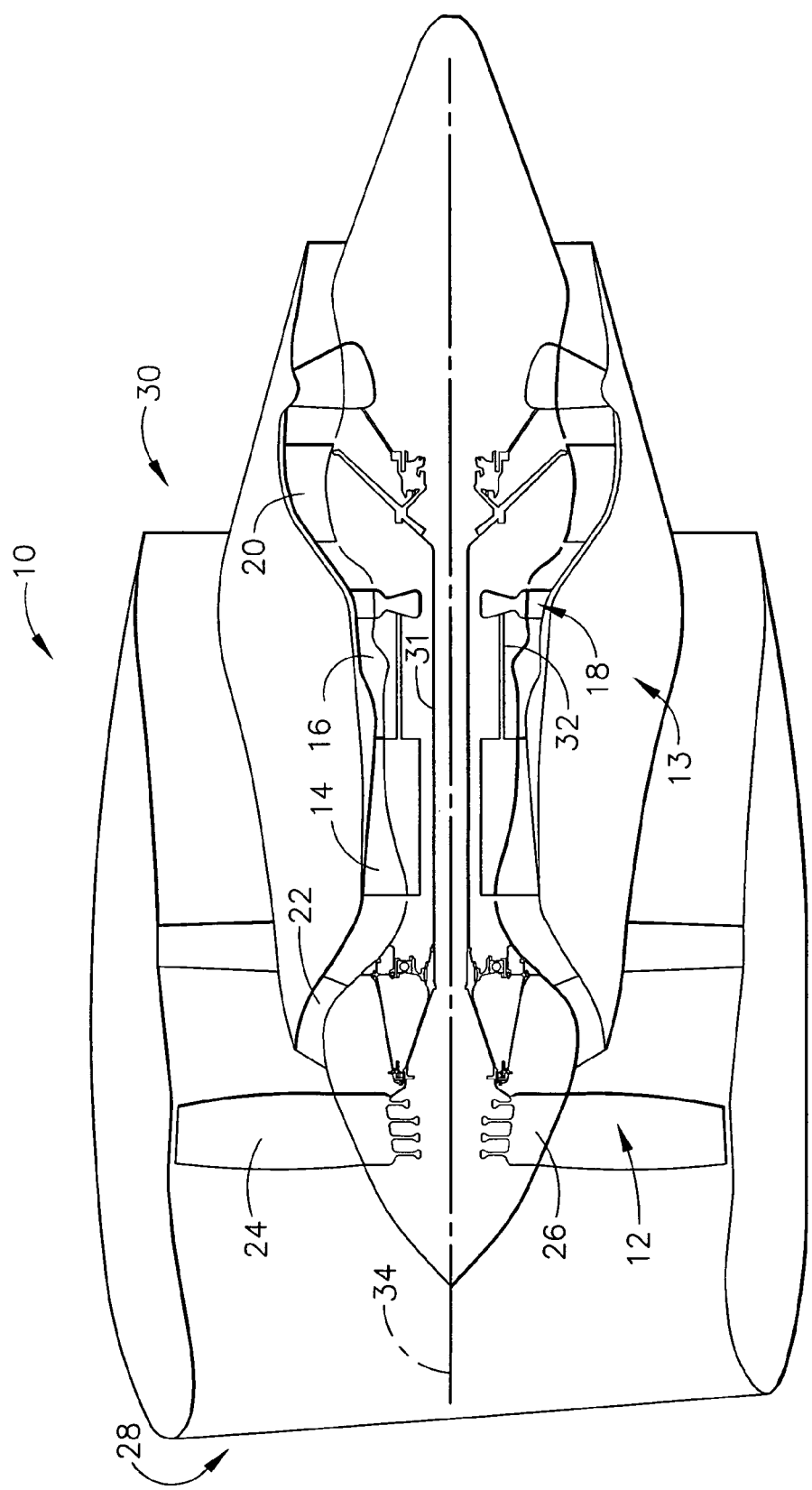
FIG. 1 is a schematic illustration of a gas turbine engine.

Referring to the drawings, FIG. 1 is a schematic illustration of a gas turbine engine 10 that includes, in an exemplary embodiment, a fan assembly 12 and a core engine 13 including a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disk 26. Engine 10 has an intake side 28 and an exhaust side 30. In one embodiment, the gas turbine engine is a GE90 available from General Electric Company, Cincinnati, Ohio. Fan assembly 12 and low pressure turbine 20 are coupled by a first rotor shaft 31, and compressor 14 and high pressure turbine 18 are coupled by a second rotor shaft 32.

During operation, air flows axially through fan assembly 12, in a direction that is substantially parallel to a central axis 34 extending through engine 10, and compressed air is supplied to high pressure compressor 14. The highly compressed air is delivered to combustor 16. Combustion gas flow (not shown in FIG. 1) from combustor 16 drives turbines 18 and 20. Turbine 18 drives compressor 14 by way of shaft 32 and turbine 20 drives fan assembly 12 by way of shaft 31.

Figure 2:
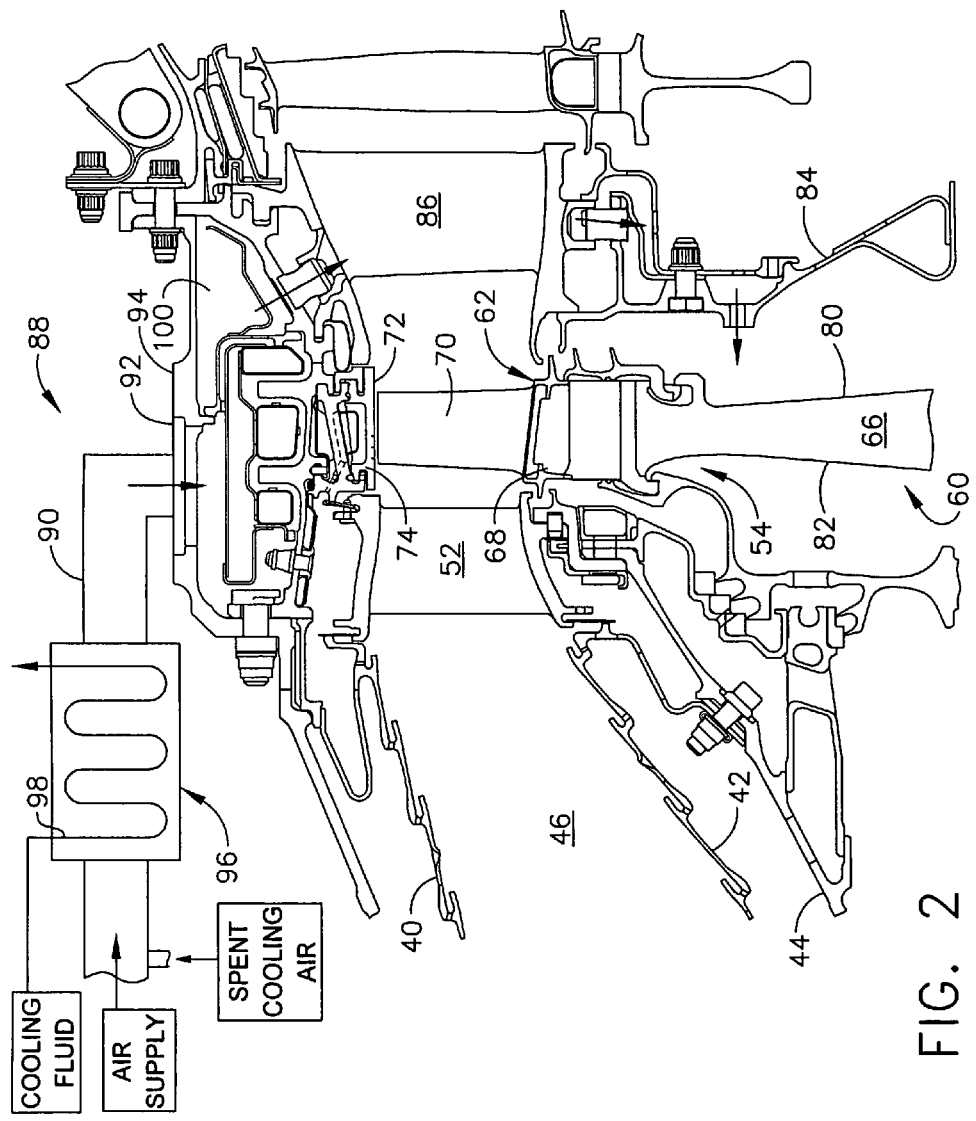
FIG. 2 is an enlarged sectional schematic illustration of a portion of the gas turbine engine shown in FIG. 1.

FIG. 2 is an enlarged sectional schematic illustration of a portion of gas turbine engine 10. Combustor 16 includes, in the exemplary embodiment, an annular outer liner 40, an annular inner liner 42, and a domed end (not shown) extending between outer and inner liners 40 and 42, respectively. Outer liner 40 and inner liner 42 are spaced radially inward from a combustor casing (not shown) and define a combustion chamber system assembly 46. An inner nozzle support 44 is generally annular and extends downstream from a diffuser (not shown). Combustion chamber 46 is generally annular in shape and is defined between liners 40 and 42. Inner liner 42 and inner nozzle support 44 define an inner passageway 50. Outer and inner liners 40 and 42 each extend to a turbine nozzle 52 positioned downstream from combustor 16.

High pressure turbine 18 is coupled substantially coaxially with compressor 14 (shown in FIG. 1) and downstream from combustor 16. Turbine 18 includes a rotor assembly 54 that includes at least one rotor 56 that is formed by one or more disks 60. In the exemplary embodiment, disk 60 includes an outer rim 62, an inner hub (not shown), and an integral web 66 extending generally radially therebetween and radially inward from a respective blade dovetail slot 68. Each disk 60 also includes a plurality of blades 70 extending radially outward from outer rim 62. Circumscribing the row of high pressure blades 70 in close clearance relationship therewith is an annular shroud 72. Shroud 72 may include a plurality of annular sectors attached at an inner side of an annular band 74 that is formed of a plurality of sectors that form a complete circle. Disk 60 extends circumferentially around rotor assembly 54 and each row of blades 70 is sometimes referred to as a turbine stage. Disk 60 includes an aft surface 80 and a fore surface 82. An aft disk cavity 84 houses disk 60.

Stationary turbine nozzles 52 are located between combustor 16 and turbine blades 70. Nozzles 52 direct the combustion gases toward turbine blades 70 and the impingement of the combustion gases on blades 70 impart a rotation of turbine disk 60. A plurality of stationary stator vanes 86 direct the combustion gases passing through turbine blades 70 to the next turbine stage (not shown).

A clearance control system 88 controls the clearance, or distance, between turbine blades 70 and turbine shroud 72. Clearance control system 88 includes a cooling air supply pipe 90 connected at one end to an air supply source, for example, the middle stages of compressor 14, or compressor 14 discharge, and at another end to a cooling air inlet 92 in a turbine casing 94. A heat exchanger 96 is coupled to and is in flow communication with cooling air supply pipe 90. Heat exchanger 96 includes a coolant loop 98 which removes heat from the cooling air as the air passes through heat exchanger 96. Any suitable coolant can be used in coolant loop 98. In one exemplary embodiment, the gas turbine engine fuel is directed through coolant loop 98. In other exemplary embodiments, turbine bearing oil or a refrigerant is directed through coolant loop 98.

In operation, cooling air is directed through cooling air supply pipe 90 and heat exchanger 96 and into cooling air inlet 92 in turbine casing 94. A coolant fluid flows through coolant loop 98 which removes heat from air passing through heat exchanger 96. The cooling air flows into a cavity 100 between turbine casing 94 and turbine shroud 72 and is used to cool turbine casing 94 and turbine shroud 72. The cooling air is then directed through stator vanes 86 and into disk cavity 84 where the cooling air is directed to aft surface 80 of disk 60 to cool disk 60. In one exemplary embodiment, a portion of the cooling air is returned to cooling air supply pipe to be re-cooled in heat exchanger 96 and reused in the cooling of casing 94, shroud 72 and disk 60.

While the invention has been described in terms of various specific embodiments, those skilled in the art will recognize that the invention can be practiced with modification within the spirit and scope of the claims.

What is claimed is:

1. A method of operating a gas turbine engine, the gas turbine engine comprising at least one engine casing, and at least one rotor assembly, said method comprising:
   directing airflow through a supply pipe from at least one of a fan, a booster, and a compressor into a heat exchanger;
   lowering the temperature of the airflow in the heat exchanger;
   directing the cooled airflow into the engine casing to cool the casing; and
   directing at least a portion of the airflow to the heat exchanger to be cooled and reused.

2. A method in accordance with claim 1 wherein said gas turbine engine further comprises a high pressure aft cavity and a high pressure turbine disk, said method further comprising:
   directing the cooled airflow to the high pressure aft cavity; and
   cooling an aft surface of the high pressure turbine disk.

3. A method in accordance with claim 1 wherein the heat exchanger comprises a coolant loop, said method further comprising directing at least a portion of the gas turbine engine fuel through the heat exchanger coolant loop to cool the airflow in the heat exchanger.

4. A clearance control system for a gas turbine engine, the gas turbine engine comprising a fan, a compressor having at least one stage and a discharge, a booster, a high pressure turbine having a least one disk, and at least one engine casing extending circumferentially around the compressor and high pressure turbine, said clearance control system comprising:
   an air supply pipe configured to direct air from at least one of the fan, the booster, and the compressor to the high pressure turbine; and
   a heat exchanger in flow communication with said air supply pipe to cool an airflow passing through said air supply pipe wherein said air supply pipe is connected to the engine casing to direct a cooling airflow inside the casing to cool the casing, said system is configured to direct the cooling airflow back to said heat exchanger to be re-cooled and reused.

5. A clearance control system in accordance with claim 4 wherein said heat exchanger comprises a coolant loop.

6. A clearance control system in accordance with claim 5 wherein said coolant loop comprises a portion of a gas turbine engine fuel line.

7. A clearance control system in accordance with claim 4 wherein the air supply pipe is coupled to the compressor discharge.

8. A clearance control system in accordance with claim 4 wherein said air supply pipe is connected to at least one of the fan, the booster, and a stage of the compressor.

9. A clearance control system in accordance with claim 4 wherein said system is configured to direct said cooling airflow to the high pressure turbine disk to cool the disk.

10. A gas turbine engine comprising:
    a compressor;
    a high pressure turbine;

an engine casing extending circumferentially around said compressor and high pressure turbine said casing comprising a cooling air inlet; and a clearance control system comprising:

an air supply pipe coupled to said casing cooling air inlet wherein said air supply pipe is configured to direct air from at least one of a fan, a booster, and said compressor to said high pressure turbine; and a heat exchanger coupled to and in flow communication with said air supply pipe to cool an airflow in said air supply pipe wherein said air supply pipe is connected to said engine casing to direct a cooling airflow inside the casing to cool said casing, said system is configured to direct the cooling airflow back to said heat exchanger to be re-cooled and reused.

11. A gas turbine engine in accordance with claim 10 wherein said heat exchanger comprises a coolant loop.

12. A gas turbine engine in accordance with claim 11 wherein said coolant loop comprises a portion of a gas turbine engine fuel line.

13. A gas turbine engine in accordance with claim 12 wherein said cooling air inlet is located in said casing to direct a cooling airflow inside said casing to cool said casing.

14. A gas turbine engine in accordance with claim 10 wherein said air supply pipe is coupled to said compressor discharge.

15. A gas turbine engine in accordance with claim 10 further comprising a fan and a booster, said air supply pipe connected to at least one of said fan, said booster, and a stage of said compressor.

16. A gas turbine engine in accordance with claim 13 wherein said clearance control system is configured to direct said cooling airflow to said high pressure turbine disk to cool said disk.

* * * * *